March 7, 1967     E. WUSTENHAGEN ETAL     3,307,883
PNEUMATIC SPRINGS
Filed Jan. 14, 1964

3,307,883
PNEUMATIC SPRINGS

Ernst Wustenhagen and Fritz Gottling, Koblenz, Gunter Otto, Moselweiss, and Wilfried Ferdinand Roos, Guls (Moselle), Germany, assignors to Stabilus, Industrie- und Handelsgesellschaft m.b.H., Koblenz-Neuendorf, Germany
Filed Jan. 14, 1964, Ser. No. 342,845
3 Claims. (Cl. 308—3.5)

As is known, the main difficulties in the production of pneumatic springs consist on the one hand in sealing off to the exterior the gas filling which is under high pressure, and on the other in so guiding the piston rod that the seal needs to take up no bending moments.

The invention is therefore based upon the problem of providing an effective seal and guide for the piston rod of a pneumatic spring.

The stated problem is solved according to the invention due to the fact that a cylindrical guide bush, subject to the pressure of the filling medium, supports itself with its stepped annular surfaces upon the sealing rings, which are separated from one another by a collar-like extension of a bearing bush.

The radial dimensions of the one sealing ring and those of the collar-like extension piece of the bearing bush are preferably made equal, while the internal diameter of the other sealing ring is equal to the external diameter of the bearing bush and its external diameter is made equal to the internal diameter of the cylinder which receives the gas under pressure. The guide bush preferably has in the region of the narrower sealing ring an annular recess in the direction towards the central bore. The guide bush may be further provided on the pressure side with a collar the diameter of which conforms with the internal diameter of the cylinder which receives the gas filling. The guide bush further may have on the pressure side an annular groove, the depth of which conforms approximately with the width of the collar.

While in the case of pneumatic springs with relatively small cylinder diameter it is sufficient if the external sealing ring is supported against the flange edge, according to a further development of the invention it is expedient in the case of pneumatic springs with larger cylinder diameter to associate with the outer sealing ring a support washer which is supported on the flange edge of the cylinder which receives the gas filling.

The manner of operation of a seal and guide according to the invention will be explained in greater detail by way of example with reference to the accompanying drawing, wherein.

Figures 1, 2:
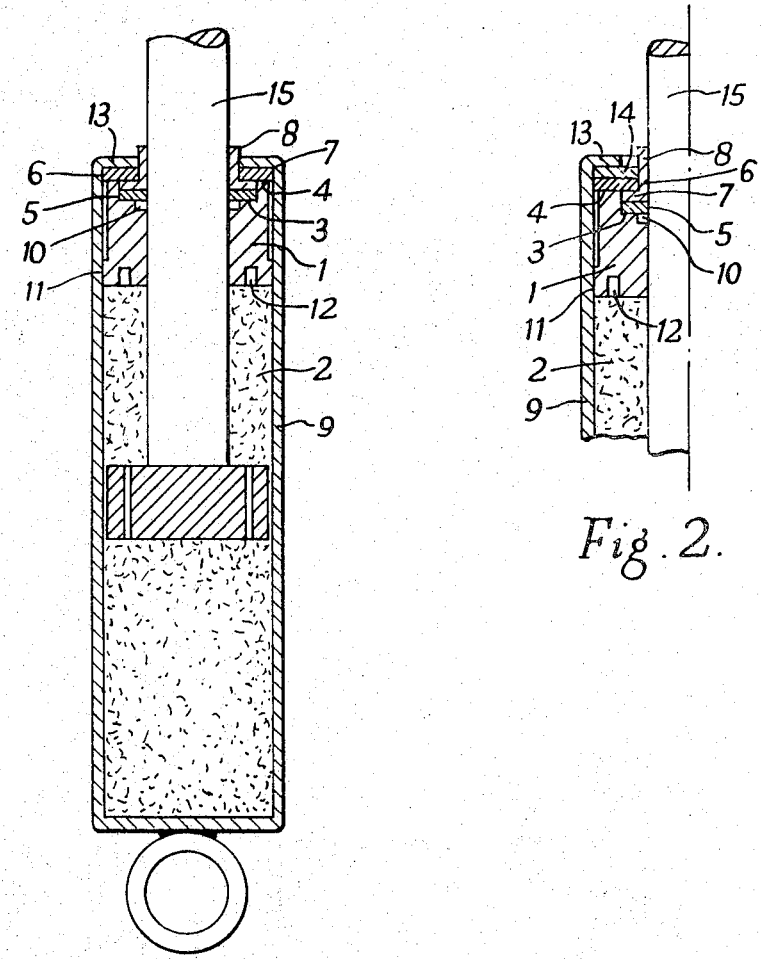
FIGURE 1 shows a section through a pneumatic spring of small diameter made in accordance with the invention.
FIGURE 2 shows a section through the seal and the guide of a pneumatic spring with larger cylinder diameter.

The guide bush 1 has on its end opposite to the filling medium 2, stepped annular surfaces 3 and 4 which support themselves upon the sealing rings 5 and 6. These two sealing rings are separated from one another by a collar-like extension piece 7, with which the bearing bush 8 is provided. While the sealing ring 5 rests on the end face of the collar-like extension piece 7 and does not extend beyond the latter in the radial direction, the sealing ring 6 rests on the flange edge 13 of the cylinder 9 (FIGURE 1) and it extends in the radial direction from the outer surface of the bearing bush 8 as far as the inner surface of the cylinder 9.

In the region of the sealing ring 5 the guide bush 1 is provided with a recess 10 in the direction towards the central bore of the guide bush. On the side opposite to the sealing rings the guide bush 1 possesses a collar 11 the diameter of which is somewhat larger than the internal diameter of the cylinder 9, in such manner that this collar in the installed condition applies itself with initial tension against the inner wall of the cylinder 9. Moreover, on the end face of the guide bush 1 on the pressure gas side there is arranged an annular groove 12, the depth of which corresponds approximately to the width of the collar 11.

While the sealing ring 6 in FIGURE 1 is supported against the flange edge 13 of the cylinder 9, in FIGURE 2, which represents an example for a pneumatic spring with larger cylinder diameter, the sealing ring 6 is mounted on a support washer 14, which again supports itself against the flange edge 13.

The guide bush 1 is pressed with its end faces 3 and 4 against the sealing rings 5 and 6 by the pressure of the filling medium 2, which rings are thereby pressed against the annular surface of the collar-like extension piece 7 or of the flange edge 13 and so elastically deformed that the filling medium 2 is satisfactorily sealed off.

The bending moments exerted upon the piston rod 15 are taken up by the guide bush 1 and the bearing bush 8, without the sealing rings 5 and 6 being thereby influenced. The annular groove 12 prevents the stresses in the guide bush 1 from being transmitted to the piston rod or giving rise to increased friction. The recess 10 is provided in order to provide a possibility of deviation for the sealing ring 5.

The damping medium may be an inert gas for example nitrogen. The pressure of this gas may be from 50 to 200 atmospheres or greater or less in some cases.

We claim:

1. A pneumatic spring comprising a cylinder having first and second end walls, a piston rod extending through said second end wall, a guide bush located in the cylinder near the second end wall of the cylinder and subjected to pressure of a gaseous filling medium in the cylinder, flat annular surfaces on the guide bush located at one end of the guide bush and spaced apart from each other axially of the guide bush, a bearing bush having a cylindrical portion extending through the second end wall of the cylinder and surrounding the piston rod and having an annular flange portion located within the cylinder and axially between said flat annular surfaces, a first sealing ring axially located between the second end wall of the cylinder on one side and the annular flange portion of the bearing bush and one of said flat annular surfaces on the other side and in engagement therewith, a second sealing ring axially located on its one side adjacent the annular flange portion of the bearing bush and on its other side the other of the flat annular surfaces of the guide bush, and an annular recess in the guide bush located at said one end of the guide bush and surrounding the piston rod to allow sealing ring displacement.

2. A pneumatic spring in accordance with claim 1 wherein the external diameter of the second sealing ring is equal to that of the annular flange portion of the bearing bush, and the external diameter of the cylindrical portion of the bearing bush is equal to the internal diameter of the first sealing ring.

3. A pneumatic spring in accordance with claim 2 wherein an annular groove is provided at the other end of the guide bush in the peripheral surface thereof and the external surface of the guide bush engages the internal wall of the cylinder only over an axial length greater than the depth of the said annular groove.

References Cited by the Examiner

UNITED STATES PATENTS

| | | | |
|---|---|---|---|
| 3,025,113 | 3/1962 | Helwig | 308—36.1 |
| 3,062,555 | 11/1962 | Britton | 188—100 |
| 3,129,948 | 4/1964 | Kendall | 277—103 X |

FOREIGN PATENTS

| | | |
|---|---|---|
| 513,797 | 9/1952 | Belgium. |
| 812,993 | 5/1937 | France. |
| 1,263,384 | 12/1961 | France. |

MARTIN P. SCHWADRON, *Primary Examiner.*

DAVID J. WILLIAMOWSKY, *Examiner.*

L. L. JOHNSON, *Assistant Examiner.*